United States Patent
Minaguchi et al.

(10) Patent No.: US 7,102,880 B2
(45) Date of Patent: Sep. 5, 2006

(54) ELECTRONIC APPARATUS HAVING LABEL WITH CERTIFICATION MARKS

(75) Inventors: Hiroyuki Minaguchi, Higashimatsuyama (JP); Yasuyuki Horii, Ome (JP); Nobuyasu Tajima, Ome (JP); Masataka Tokoro, Tachikawa (JP); Takayuki Arisaka, Ome (JP); Yasuyuki Suzuki, Fussa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 951 days.

(21) Appl. No.: 10/194,625

(22) Filed: Jul. 12, 2002

(65) Prior Publication Data

US 2003/0043536 A1    Mar. 6, 2003

(30) Foreign Application Priority Data

Aug. 30, 2001 (JP) .............................. 2001-262023

(51) Int. Cl.
*G06F 1/16* (2006.01)
*H05K 7/10* (2006.01)
*B42D 15/00* (2006.01)
(52) U.S. Cl. .......................... 361/683; 283/81; 40/663
(58) Field of Classification Search ................ 361/683, 361/685; 40/663; 283/81
See application file for complete search history.

(56) References Cited

U.S. PATENT DOCUMENTS

| | | | | | |
|---|---|---|---|---|---|
| 3,726,030 A | * | 4/1973 | Wilson | ...................... | 40/638 |
| 4,784,408 A | * | 11/1988 | Yasuda | ...................... | 283/81 |
| 5,455,737 A | * | 10/1995 | Ogami et al. | .............. | 361/680 |
| 6,829,851 B1 | * | 12/2004 | Oross et al. | ............. | 40/124.06 |
| 6,877,264 B1 | * | 4/2005 | Mautz | ...................... | 40/663 |
| 7,027,296 B1 | * | 4/2006 | Bock | ...................... | 361/683 |

FOREIGN PATENT DOCUMENTS

KR    1999-016061    5/1999

OTHER PUBLICATIONS

Chinese Office Action dated Jul. 16, 2004.
Specification of Motorola T189, Apr. 12, 2001.

* cited by examiner

*Primary Examiner*—Lisa Lea-Edmonds
(74) *Attorney, Agent, or Firm*—Pillsbury Winthrop Shaw Pittman LLP

(57) ABSTRACT

An electronic apparatus includes a main body containing an electronic component. The main body includes a receptacle in which a functional component is detachably received therein, and a label indicating that the electronic apparatus provided with the electronic component is certified. The label is exposed to the outside of the main body through the receptacle when the functional component is detached from the receptacle.

18 Claims, 5 Drawing Sheets

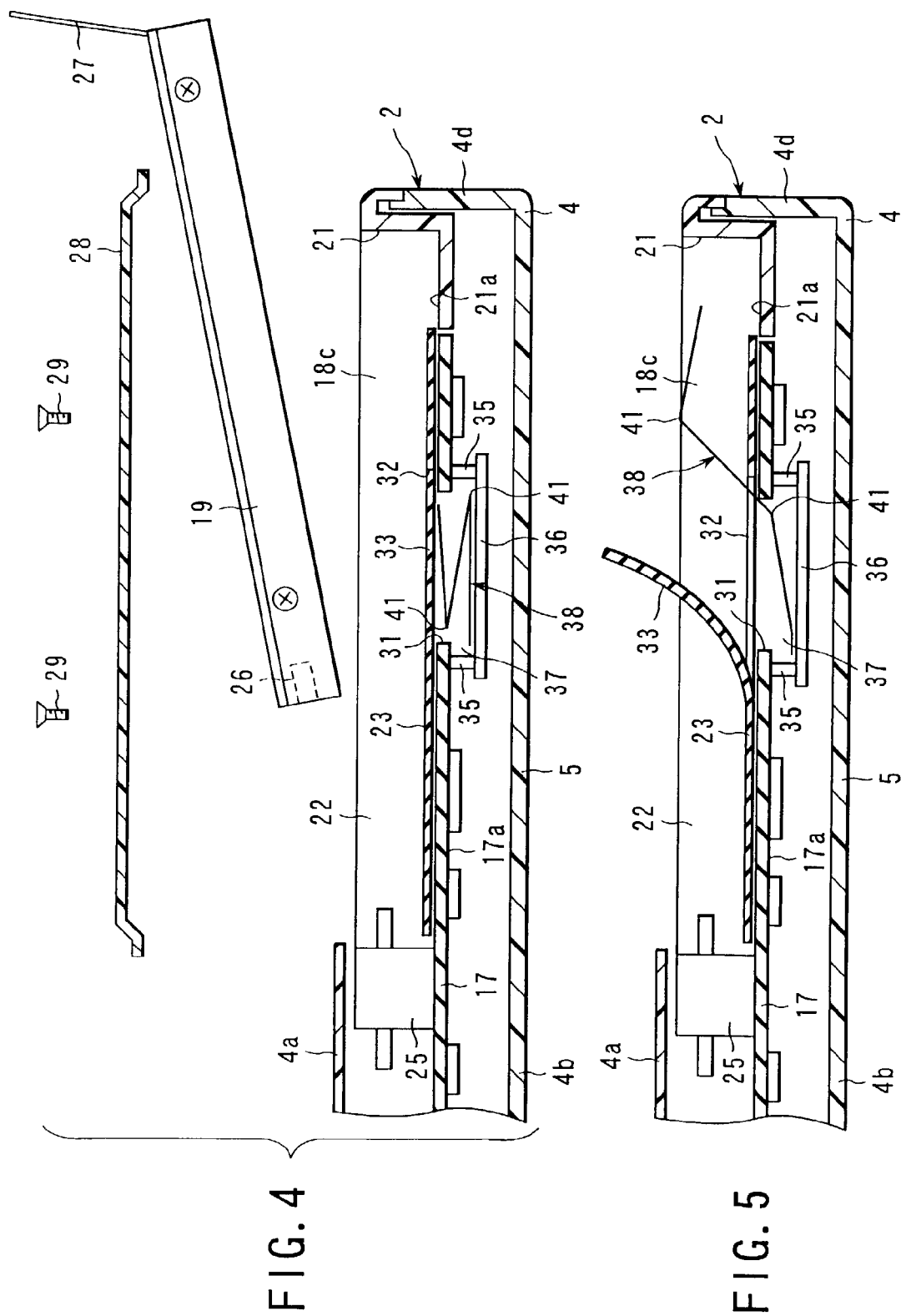

ELECTRONIC APPARATUS HAVING LABEL WITH CERTIFICATION MARKS

CROSS-REFERENCE TO RELATED APPLICATIONS

This application is based upon and claims the benefit of priority from prior Japanese Patent Application No. 2001-262023, filed Aug. 30, 2001.

BACKGROUND OF THE INVENTION

1. Field of the Invention

The present invention relates to an electronic apparatus equipped with, for example, an electronic component having a radio communication function, and more particularly to a structure for attaching, to an electronic apparatus, a label indicating that the apparatus is certified by the related radio wave legislation.

2. Description of the Related Art

For electronic apparatuses such as portable computers, it is important to enhance their portability in order to increase their value as a commodity. To this end, recent portable computers are designed thin and compact. Accordingly, there is a tendency of the inner space of their main body being narrowed. This being so, a number of components, such as a printed circuit board with a CPU, a hard disk drive device, a battery, etc., are densely housed in the main body.

On the other hand, various portable computers equipped with a radio communication module, such as a wireless LAN, are now available. Since these portable computers are considered radio apparatuses, they need to be certified by the related legislation of the country or area in which they are to be sold. Further, their manufacturers must exhibit that the computers are certified. In a certain country or area, it is necessary to attach, to each computer, a label with a mark or symbol indicating that each computer is certified, and to make the label visible.

In an existing portable computer, the aforementioned label is attached to a modem device housed within a recess of the main body, and a removable lid (securable by a screw) is placed directly over the modem device within the recess to cover the recess. When the lid is removed, the label having the mark or symbol on the label is in view from outside of the main body.

It is necessary to locate the indication label corresponding to or adjacent to a radio communication module installed in the main body. In other words, their locations are limited. In addition, a plurality of components are densely housed in the main body as aforementioned. Therefore, it is very difficult to secure a space for the label and confirmation window and hence to lay them out. Depending upon the location of the confirmation window, it is possible that the label may be very hard to see.

Furthermore, in conventional portable computers, since the main body needs such a structure for supporting the openable/closable lid, it is inevitably complicated and requires a large number of components. As a result, the costs involved increase.

BRIEF SUMMARY OF THE INVENTION

It is an object of the present invention to provide an electronic apparatus with an easily recognizable label contained in its main body, the main body having a simple structure and formed from a small number of components.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 4 is a sectional view of the portable computer according to the embodiment of the invention, illustrating a positional relationship between a third receptacle of the main body of the computer, hard disk drive unit, and Mobile audio/modem Daughter Card (MDC) unit and label;

FIG. 5 is a sectional view of the portable computer according to the embodiment of the invention, illustrating a state in which the label is withdrawn to the third receptacle through a hole.

DETAILED DESCRIPTION

An embodiment of the present invention will be described with reference to the accompanying drawings.

Figure 1:
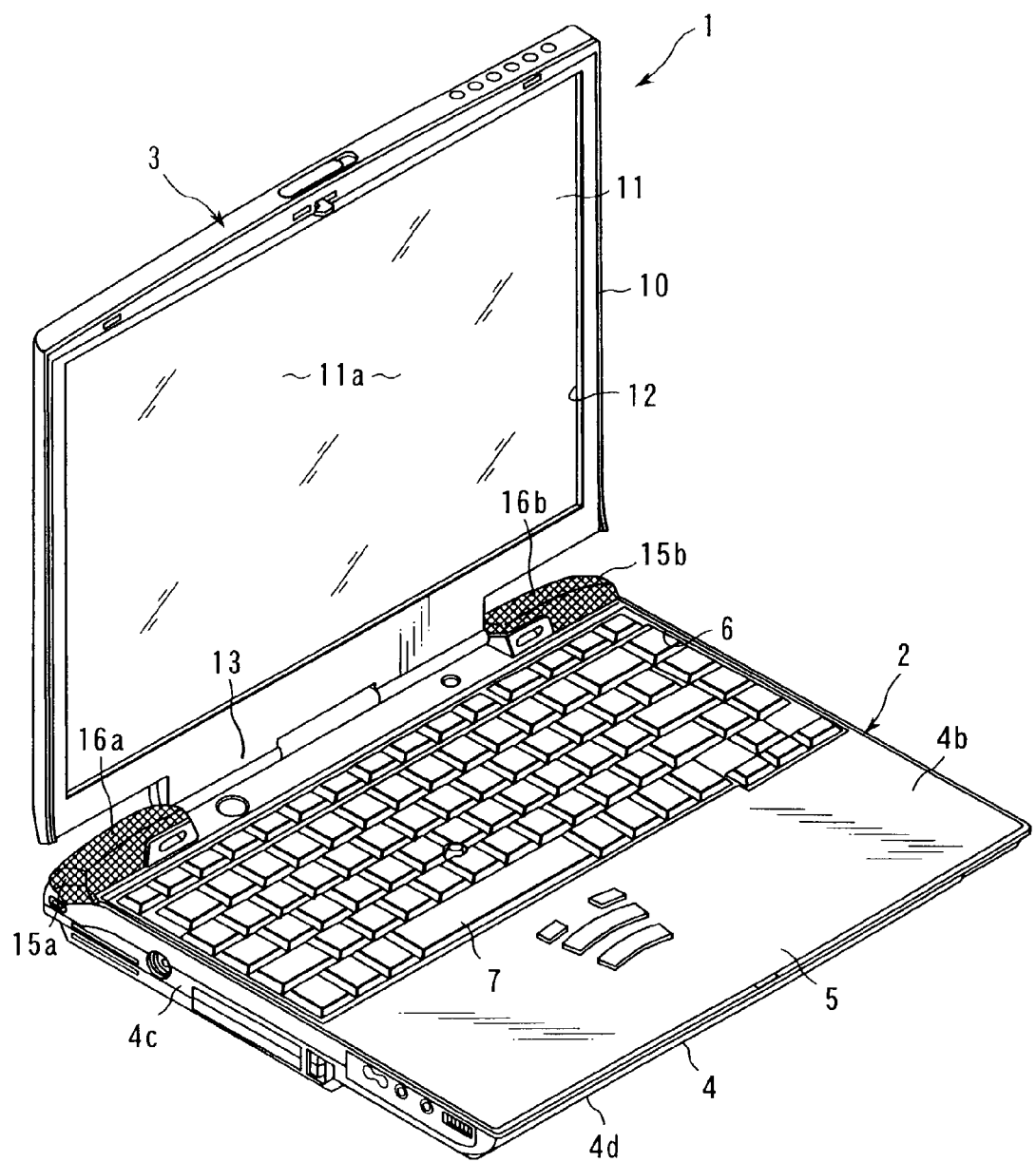
FIG. 1 is a perspective view of a portable computer according to an embodiment of the invention, illustrating a state in which its display unit is rotated to an opened position.
Figure 2:
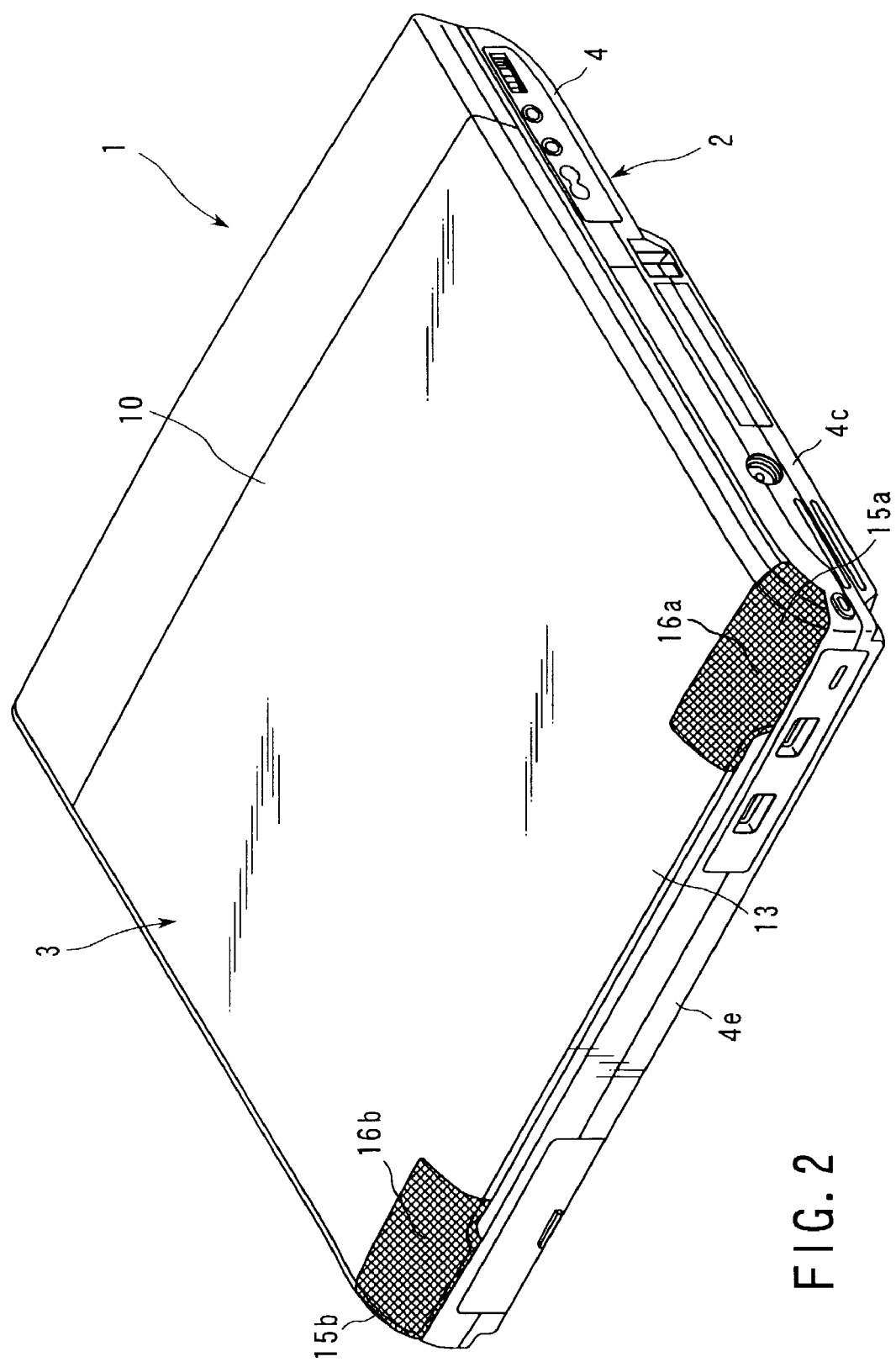
FIG. 2 is a perspective view of the portable computer according to the embodiment of the invention, illustrating a state in which the display unit is rotated to a closed position.
Figure 3:
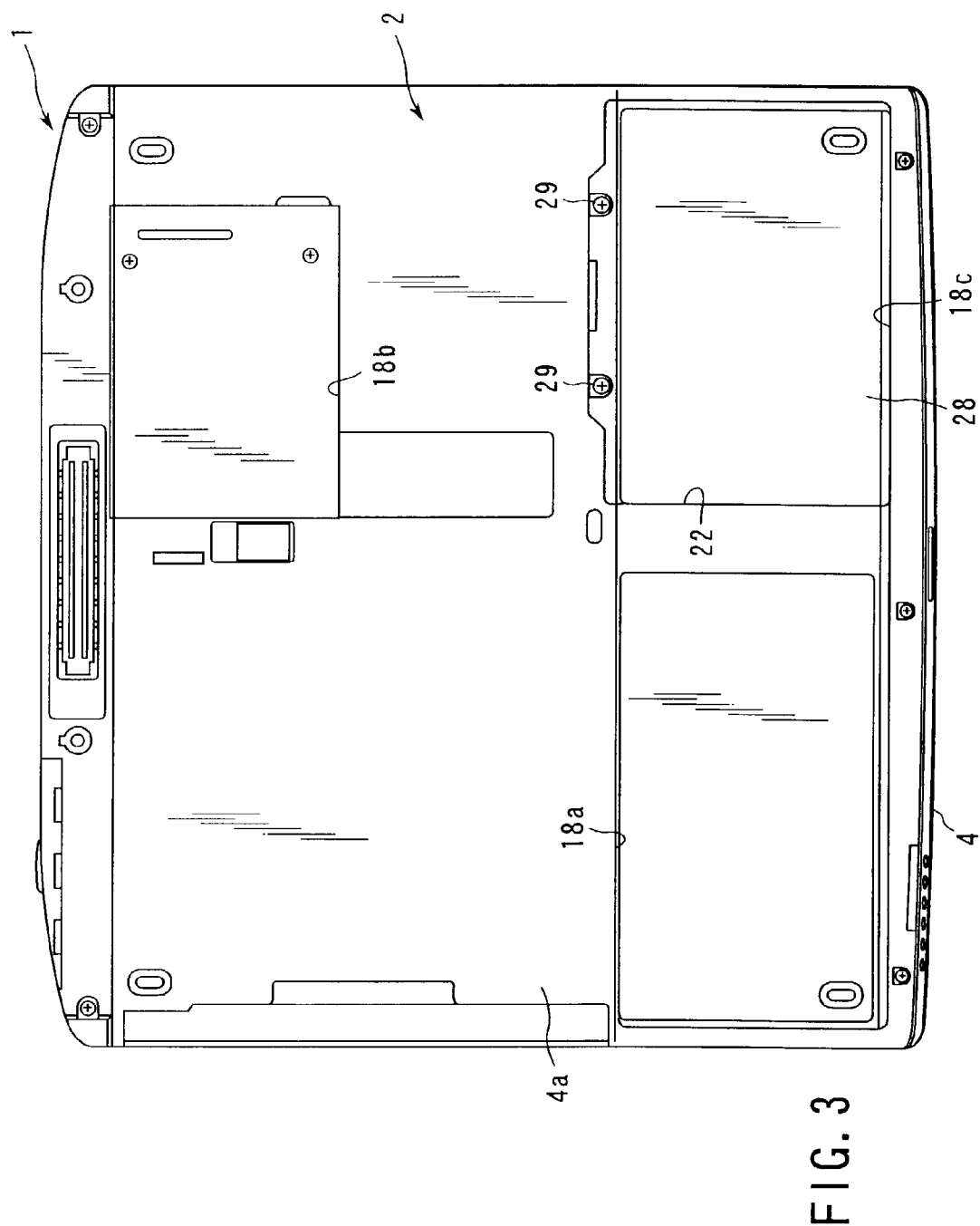
FIG. 3 is a bottom view of the portable computer according to the embodiment.

FIGS. 1 to 3 show a portable computer 1 as an electronic apparatus. The portable computer 1 includes a main body 2 and display unit 3. The main body 2 includes a flat box-shaped housing 4. The housing 4 has a bottom 4a, upper wall 4b, left and right side walls 4c, and front and rear walls 4d and 4e. The upper wall 4b has a palm rest 5 and keyboard mount section 6. The palm rest 5 is formed of a front portion of the upper wall 4b of the housing 4, and it extends along the entire length of the housing 4. The keyboard mount section 6 is located behind the palm rest 5, and has a keyboard 7.

The display unit 3 comprises a display housing 10 and liquid crystal display 11. The display housing 10 is flat and box-shaped, having an opening 12 at its front side. The liquid crystal display 11 has a display screen 11a for displaying information such as characters and images. The display screen 11a is exposed to the outside of the display housing 10 through the opening 12.

The display housing 10 has a leg portion 13 at its one end. The leg portion 13 is located at a lengthwise central portion of the display housing 10 and forms a projection that is coupled to the rear end of the housing 4 by a hinge unit (not shown). Accordingly, the display unit 3 can pivot between a closed position in which it is folded over the palm rest 5 and keyboard 7, and an opened position in which it stands upright, exposing the palm rest 5, keyboard 7 and display screen 11a.

As shown in FIGS. 1 and 2, speaker boxes 15a and 15b are separately provided on rear corners of the upper wall 4b of the housing 4, and project upwards. The leg section 13 of the display housing 10 is located between the speaker boxes 15a and 15b.

The speaker boxes 15a and 15b have respective arcuate speaker covers 16a and 16b that are coupled to the rear wall 4e. Further, as shown in FIG. 2, the leg portion 13 has arcuate back surfaces, and the display housing 10 has arcuate back surfaces. When the display unit 3 is in the closed position, the arcuate back surfaces of the leg portion 13 and display housing 10 abut the arcuate upper surfaces of the speaker covers 16a and 16b.

As shown in FIG. 4, the main body 2 contains a printed circuit board 17 parallel to the bottom 4a of the housing 4. The printed circuit board 17 is located below the palm rest 5.

As shown in FIG. 3, the main body 2 includes first to third receptacles 18a, 18b and 18c. The first receptacle 18a receives a battery pack (not shown). The second receptacle 18b receives a DVD drive unit (not shown). The third receptacle 18c receives a hard disk drive unit 19 as a functional component. The first and third receptacles 18a and 18c are located below the palm rest 5 and near to each other in the longitudinal direction.

FIGS. 4 and 5 each show a state in which the main body 2 is turned upside-down, i.e., the bottom 4a is above the upper wall 4b. As is seen from FIGS. 4 and 5, the third receptacle 18c has a recess 21. The recess 21 has a size that permits the hard disk drive unit 19 to be fitted therein. The recess 21 includes a rectangular opening 22 formed in the bottom 4a of the housing 4, and a bottom 21a opposing the opening 22. The greater part of the bottom 21a is formed of the printed circuit board 17. Thus, the printed circuit board 17 is exposed through the third receptacle 18c and the exposed portion is covered with a transparent insulation sheet 23.

The printed circuit board 17 has a connector 25, which is located in the recess 21 and opposes a connector receptacle 26 formed in an end portion of the hard disk drive unit 19 when the unit 19 is received in the recess 21. Accordingly, when the hard disk drive unit 19 has been slid to the connector 25 after it is inserted in the recess 21, the connector 25 is fitted into the receptacle 26. As a result, the hard disk drive unit 19 is electrically connected to the printed circuit board 17.

The hard disk drive unit 19 has a grip tab 27. The grip tab 27 is gripped to detach the hard disk drive unit 19 from the recess 21. The grip tab 27 is secured to the opposite end of the unit 19 with respect to the connector receptacle 26. Accordingly, when the grip tab 27 is gripped and pulled away from the connector 25, the connector receptacle 26 is disengaged from the connector 25. As a result, the hard disk drive unit 19 is electrically disconnected from the printed circuit board 17.

The opening 22 of the third receptacle 18c is covered with a lid 28 detachably secured to the bottom 4a of the housing 4 by two screws 29.

Figure 6:
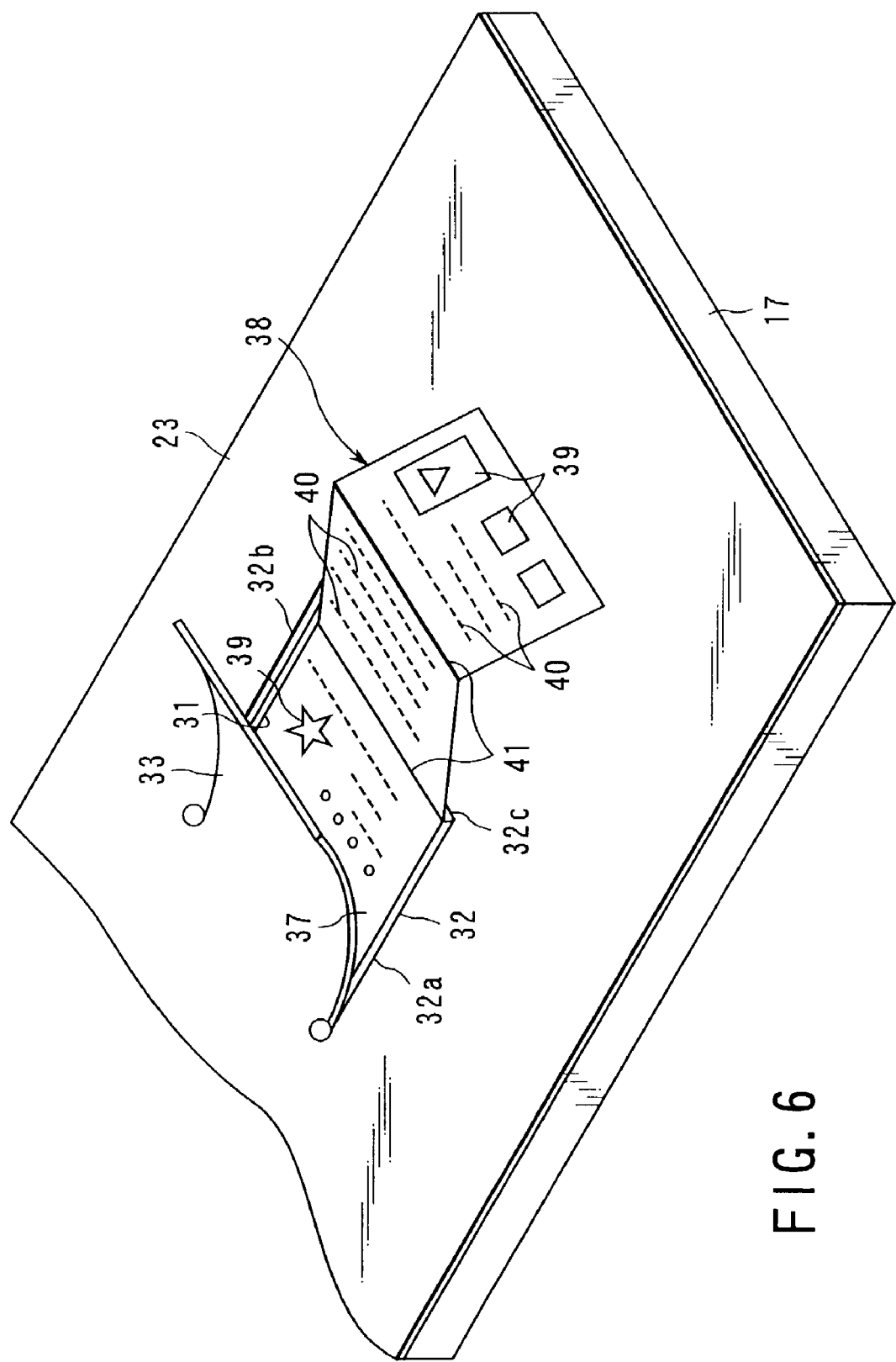
FIG. 6 is a perspective view illustrating the state in which the label is withdrawn to the third receptacle through the hole.

As shown in FIGS. 4 and 5, the printed circuit board 17 has a rectangular through hole 31, which is formed at a location corresponding to the third receptacle 18c and is covered with the aforementioned insulation sheet 23. The insulation sheet 23 has a cut portion 32 at a location corresponding to the hole 31. As shown in FIG. 6, the cut portion 32 is defined by first to third straight lines 32a, 32b and 32c. The first and second straight lines 32a and 32b extend parallel to each other with a space therebetween. The third straight line 32c connects the first and second lines 32a and 32b. The portion obtained by cutting the sheet 23 along the first to third straight lines 32a–32c serves as a cover portion 33 that may be bent back so as to expose the through hole 31.

As shown in FIGS. 4 and 5, the printed circuit board 17 includes a mount surface 17a located opposite the third receptacle 18c. An MDC (Mobile audio/modem Daughter Card) unit 36, as an electronic component, is mounted on the mount surface 17a by a plurality of stud bolts 35. The stud bolts 35 are located around the through hole 31, upwardly projecting from the mount surface 17a. Accordingly, the MDC unit 36 is situated above the mount surface 17a by the length of the stud bolts 35. Further, the MDC unit 36 faces the through hole 31, thereby defining a storage space 37 therebetween.

The MDC unit 36 has a radio communication function. The portable computer 1 equipped with the MDC unit 36 is a kind of radio unit. Therefore, when selling the portable computer 1, the computer needs to be certified by the legislation relating to the country or area in which it is to be sold. Further, the manufacturer of the portable computer 1 needs to exhibit that that model has passed a certifying examination, and to make a label indicative of this visible in certain countries or areas.

In light of this, in the embodiment, a label 38 indicating that the portable computer 1 has passed a model certifying examination is received in the storage space 37. The label 38 is in the shape of a strip, and is printed with a plurality of marks 39 and symbols 40, which certify that the portable computer 1 satisfies predetermined specifications. The width-directional one end of the label 38 is stuck to the MDC unit 36. The label 38 has a plurality of fold lines 41 at intervals in the longitudinal direction, at which the label 38 may be folded. The folded label 38 is kept in the storage space 37 by the cover portion 33 of the insulation sheet 23.

A description will now be given of a procedure for visually confirming the marks 39 and symbols 40 on the label 38.

Firstly, the screws 29 that fix the lid 28 are loosened and removed, thereby detaching the lid 28 from the bottom 4a of the housing 4. As a result, the hard disk drive unit 19 is exposed through the opening 22 of the third receptacle 18c. In this state, the user grips the grip tab 27 of the hard disk drive unit 19, and pulls it away from the connector 25. The hard disk drive unit 19 is then slid away from the connector 25, disconnecting it from the connector receptacle 26. Accordingly, the hard disk drive unit 19 is electrically disconnected from the printed circuit board 17, and is removed from the third receptacle 18c.

When the hard disk drive unit 19 has been removed from the third receptacle 18c, the insulation sheet 23 on the bottom 21a of the recess 21 is exposed. Since the insulation sheet 23 is transparent, the user can see the through hole 31 of the printed circuit board 17 and the storage space 37 through the insulation sheet 23.

After that, the user bends back the cover portion 33 of the insulation sheet 23 to gain entry, through the through hole 31, to the label 38 that can then be withdrawn from the storage space 37. As a result, the label 38 is opened out into a strip as shown in FIGS. 5 and 6, enabling the marks 39 and symbols 40 thereon to be visually confirmed.

In the above structure, the storage space 37 is formed in the bottom 21a of the third receptacle 18c for storing the hard disk drive unit 19, and the label 38 is stored in the space 37. Accordingly, as long as the hard disk drive unit 19 is not in the third receptacle 18c, the label 38 stored in the storage space 37 may be drawn into the third receptacle 18c, and the marks 39 and symbols 40 thereon may be confirmed.

Thus, the label 38 may be provided in the dead space between the bottom 21a of the third receptacle 18c and the MDC unit 36. This configuration means that it is not necessary to secure in the housing 4 a space dedicated to the label 38 or to form a confirmation window for exposing the label 38. Therefore, the structure of the housing 4 may be simplified, and hence the number of components required for the portable computer 1 may be reduced, with the result that the cost of the computer 1 may be reduced.

Further, in the above-described structure, the label 38 and through hole 31 are usually hidden by the lid 28 that covers the hard disk drive unit 19. Accordingly, the label 38 cannot be seen from the outside except at the time it needs to be seen. This configuration enhances the appearance of the portable computer 1.

In addition, the through hole 31 for withdrawing the label 38 is covered with the cover portion 33 of the insulation sheet 23. Since the insulation sheet 23 is interposed between the hard disk drive unit 19 and label 38, there is no interference therebetween, which means that the label 38 may be prevented from being damaged even if the hard disk drive unit 19 is repeatedly attached and detached.

Although in the above embodiment, the through hole is formed in the bottom of the third receptacle, and the label is located below the bottom, the invention is not limited to this structure. For example, the through hole may be formed in the bottom of the first or second receptacle, and the label may be located below the bottom of the first or second receptacle.

Furthermore, in place of the through hole formed in the bottom of the third receptacle for drawing the label therethrough, a transparent window for enabling the label to be seen therethrough may be provided.

Also, the electronic component employed is not limited to the MDC unit having a radio communication function. It may be any other component, the standards or specifications of which need to be exhibited.

The electronic apparatus of the invention is not limited to a portable computer, but is also applicable to any other portable device, such as a PDA (Personal Digital Assistant).

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An electronic apparatus, comprising:
a main body containing an electronic component;
a receptacle formed in the main body such that a functional component is detachably received therein; and
a label that indicates that the electronic apparatus provided with the electronic component is certified, the label being exposed to an outside of the main body through the receptacle when the functional component is detached from the receptacle.

2. An electronic apparatus according to claim 1, wherein the main body has a bottom, the receptacle has a recess formed in the bottom, and the label is located at the bottom of the recess.

3. An electronic apparatus according to claim 2, wherein the recess has a through hole formed in the bottom, and the label is situated at a location corresponding to the through hole.

4. An electronic apparatus according to claim 3, wherein the bottom of the recess is covered with an insulation sheet, the insulation sheet having a cover portion located corresponding to the through hole, the cover portion being able to be folded to thereby expose the through hole.

5. An electronic apparatus according to claim 4, wherein the insulation sheet is transparent.

6. An electronic apparatus according to claim 2, wherein the recess has an opening formed in the bottom of the main body, the opening being covered with a detachable lid.

7. An electronic apparatus according to claim 1, wherein the label is stored folded and is unfoldable.

8. An electronic apparatus according to claim 1, further including a printed circuit board contained in the main body, the printed circuit board being exposed to the receptacle and mounted with the electronic component.

9. An electronic apparatus according to claim 8, wherein the electronic component has a radio communication function, and the label displays thereon a mark and a symbol that indicate that the electronic apparatus has passed a model certifying examination relating to radio wave legislation.

10. An electronic apparatus, comprising:
a main body including an outer wall;
a printed circuit board contained in the main body and mounted with an electronic component having a radio communication function;
a receptacle in which a functional component is detachably received, the receptacle including a recess formed in the outer wall of the main body, the printed circuit board being located at a bottom of the recess; and
a label that indicates that the electronic component provided with the electronic apparatus is certified, the label being located at the bottom of the recess and exposed to an outside of the main body through the receptacle when the functional component is detached from the receptacle.

11. An electronic apparatus according to claim 10, wherein the electronic component opposes the receptacle with the printed circuit board interposed therebetween, the printed circuit board having a through hole at a location corresponding to the electronic component, the through hole communicating with the receptacle, and the label being supported by the electronic component at a location corresponding to the through hole.

12. An electronic apparatus according to claim 11, wherein the printed circuit board is covered with an insulation sheet, the insulation sheet having a cover portion located corresponding to the through hole, the cover portion being able to be folded to thereby expose the through hole.

13. An electronic apparatus according to claim 12, wherein the label is flexibly folded.

14. An electronic apparatus, comprising:
a main body including a receptacle in which a functional component is detachably received; and
a label contained in the main body, the label being exposed to an outside of the main body through the receptacle when the functional component is detached from the receptacle.

15. An electronic apparatus according to claim 14, further including an electronic component contained in the main body and having a radio communication function, the label indicating that the electronic apparatus equipped with the electronic component satisfies a predetermined specification.

16. An electronic apparatus, comprising:
a main body containing an electronic component;
a receptacle formed in the main body such that a functional component is detachably received therein; and
a label indicative of a specification of the electronic component, the label being exposed to an outside of the main body through the receptacle when the functional component is detached from the receptacle.

17. An electronic apparatus according to claim 16, wherein the label is stored folded and is unfoldable.

18. An electronic apparatus according to claim 16, wherein the electronic component has a radio communication function, and the label displays thereon a mark and a symbol that indicate that the electronic apparatus has passed a model certifying examination relating to radio wave legislation.

* * * * *